Nov. 6, 1934.                    G. CROOM                    1,979,675
           ADJUSTABLE FRICTION CRANK FOR COUNTERBALANCED PUMPING UNITS
                  Filed Jan. 14, 1931          2 Sheets-Sheet 1

Inventor
Guy Croom
Jesse R Stone
By
Lester B Clark
Attorneys

Nov. 6, 1934.  G. CROOM  1,979,675

ADJUSTABLE FRICTION CRANK FOR COUNTERBALANCED PUMPING UNITS

Filed Jan. 14, 1931  2 Sheets-Sheet 2

Inventor
Guy Croom
Jesse R Stone
Lester B Clark
Attorneys.

By

Patented Nov. 6, 1934

1,979,675

UNITED STATES PATENT OFFICE 1,979,675

ADJUSTABLE FRICTION CRANK FOR COUNTERBALANCED PUMPING UNITS

Guy Croom, Lufkin, Tex., assignor to Lufkin Foundry & Machine Company, Lufkin, Tex.

Application January 14, 1931, Serial No. 508,790

4 Claims. (Cl. 287—52.02)

The invention relates to an improvement in pumping units such as are used in connection with removing of fluids from oil and gas wells and is particularly an improvement in connection with the attachment of the crank arm to the crank shaft.

In the operation of pumping units of the type disclosed it is usual to provide a counterbalance weight for use in connection with the crank arm of the pumping unit so that the weight of the rods and liquid in the well will be counterbalanced. It is also usual to employ the power unit of the pumping mechanism as a drive for the winch when pulling tubing or rods so that it is of material advantage to disconnect the crank arm and counterweight from the drive shafts of the pumping unit.

It is therefore one of the objects of this invention to provide a crank shaft which may be readily disconnected so that it may hang free during the rotation of the crank shaft on which it is mounted.

Another object of the invention is to provide a crank arm adapted for connection to rotate with a crank shaft and also arranged to allow independent rotation of the crank shaft while the crank arm is suspended therefrom.

Another object of the invention is to provide a crank arm and a crank shaft wherein the crank may be adjusted circumferentially of the crank shaft and be arranged for suspension upon the crank shaft when the shaft is rotating independently of the crank arm.

A still further object of the invention is to provide a weighted crank arm which is adapted for adjustment circumferentially about the shaft on which it is mounted.

A still further object of the invention is to provide an antifriction bearing between the crank and the crank shaft so that the weight of the crank will not materially affect the rotation of the crank shaft when the crank arm is disconnected.

A still further object of the invention is to provide a crank arm which is rotatable with respect to the shaft on which it is mounted and wherein locking devices are provided for attachment of the crank shaft in any desired circumferential position.

One of the principal objects of the invention is to provide a crank which is locked for rotation with the crank shaft by friction.

It is believed that various other and further objects of the invention will be readily apparent to those skilled in the art to which the invention appertains when the following description is considered in connection with the accompanying drawings wherein Fig. 1 is a side elevation of a crank of a type well known in the art in which the invention has been incorporated.

The present invention is in the nature of an improvement over the structure described in my application, Serial No. 434,220, filed March 8, 1930.

Figure 5:
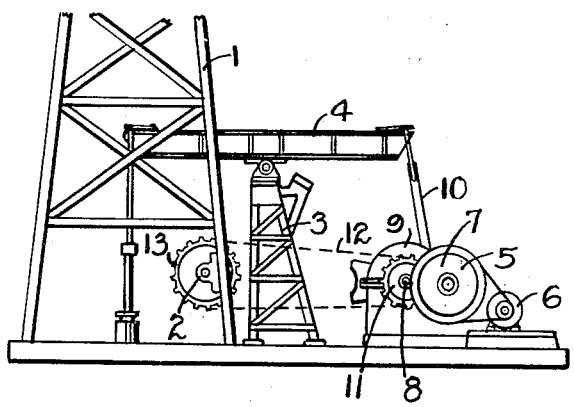
Fig. 5 is a diagrammatic view showing in side elevation the pumping unit, Samson post, well derrick and draw works so that the relationship of the present invention with these operating parts will be understood.

The invention will be best understood by having reference to Fig. 5 wherein the derrick is indicated generally at 1, the draw works at 2, Samson post at 3, the walking beam at 4, and the pumping unit at 5. A suitable source of power is provided in connection with the pumping unit and an electric motor 6 has here been shown for purposes of illustration. This motor drives the wheel 7, which is connected with the gear reduction mechanism embodied in the housing 9, the last gear of which is mounted upon the crank shaft 8, which extends from opposite sides of the housing 9. A drive sprocket 11 is mounted on one end of the crank shaft 8 and is connected by a chain or belt 12 for driving the sprocket 13 on the hoist winch or draw works. In this manner when it is desired to pull the rods or tubing from the well, a cable may be threaded over the crown block or pulley and the power unit 6 utilized by rotation of the crank shaft 8 to operate the hoist as desired.

On the end of the crank shaft 8, opposite to the sprocket 11, is the crank arm 15. This crank may be of any desired type and is mounted on the crank shaft so that it may be adjusted circumferentially thereabout by means of the connecting device best seen in section in Fig. 2. The crank may be of the type shown in Fig. 1 wherein the body of the crank is provided with slots 16 arranged to receive the bolts 17, which in turn support the weight members 18 on the edge of the crank. With this construction the weights are adjustable longitudinally of the crank to vary the amount of counterbalancing, which is available in proportion to the weight of the rods and fluid in the well. Such a crank is well known in the oil fields and is disclosed in my prior Patent No. 1,588,784, granted June 15, 1926. This type of crank has been embodied in the present drawings for purposes of illustration only as it is intended that other types of crank may be used and in Fig. 3 a weighted crank has been illustrated at 15' wherein the equivalent of weights 18 have been formed integral with the crank 15'.

The mechanism for connecting the crank 15 with the shaft 8 so that the crank will be rotated with the shaft by frictional engagement is one of the important parts of the invention. It is intended that various modes of attachment of the crank and shaft may be devised and the present application merely discloses one such mechanism which embodies a hub 20, which is recessed at 21 and provided with an outstanding annular rim or flange 22. This hub is also provided with a cut-away portion to form the shoulder 23, and is adapted to be keyed to the shaft 8 by the key 24. It seems apparent that this hub 20 will therefore be fixed to the crank shaft 8 and rotated therewith at all times. The crank 15 is provided with a tapered groove 25, which is adapted to receive the flange or rim 22 on the hub 20. The tapered faces of this rim 22 and the groove 25 are adapted for engagement when the parts are drawn together to fix the hub so that the crank will rotate therewith. In the bottom of this groove 25 a band of friction material 26 may be provided so that the parts will abut with each other and a greater frictional contact will be had between the parts. This band of material may be formed of composition such as brake lining or similar material and is held in position by means of bolts or other means indicated at 27. In order to draw the two parts together a locking ring 30 has been provided which is arranged to seat in the depression 31 formed in one side of the crank 15 and also abut against the shoulder 23 on the hub 20. A plurality of bolts 32 preferably extend through the crank arm and into the locking ring 30 so that it may be drawn up tightly to wedge the rib 22 in the groove 25. With the parts in position shown in Fig. 2 the crank 15 will rotate with the hub 20 which is in turn fixed for rotation with the crank shaft 8 and the entire device will rotate as a unitary structure. It is intended in the further development of the invention that different types of friction connection members may be used than the wedge clutch here illustrated.

As stated heretofore, occasion often arises when it is desired to allow the crank and the weights or pitman rod connected thereto to depend freely from the crank shaft so that the shaft may rotate independently of the crank. To accomplish this with the present structure it is only necessary to loosen up the bolts 32 so that the locking ring 30 will release its grip on the shoulders 23 and allow the crank 15 to rotate free of the shaft. The force of gravity on the crank arm will cause it to depend vertically from the shaft as the shaft rotates. The weights 18 are usually quite heavy and it is one of the objects of this invention to provide an antifriction bearing to carry the stress set up by the weights 18 as they depend from the crank shaft. This antifriction bearing is indicated generally at 35 and comprises a race member 36 adapted to fit in the recess 37 formed in the hub 20 and a second race member 38 seated in the recess 39 in the crank 15. Suitable antifriction roller bearings are provided between the two race members as is usual in such antifriction bearings. A packing ring 40 is shown as being carried by the crank 15 to exclude dirt and retain lubricant within the antifriction bearings. A cover plate or protecting ring 43 is arranged to overlie the bearing 35 and is held in position by the bolts 44 which are shown as connected with the crank 15. A second packing ring 45 is mounted in the holding ring 43 so that the antifriction bearing is substantially closed off to exclude dirt and retain lubricant therein. With this construction when the crank is freed of the hub 20 the weight of the crank will be sustained by the roller bearing 35 so that undue friction and resistance to rotation will be eliminated as respects the crank shaft 8. It is understood that the crank shaft 8 when used for pulling rods and tubing rotates at a relatively high speed so that the antifriction bearings eliminate heating and permit considerable saving in power.

Another advantage of the present construction is that the pitman rod 10 may remain connected to the crank arm 15 while the rods and tubing are being pulled, whereas with the structures now in use it is usually necessary to entirely disconnect the pitman rod and, in some instances, the wrist pin from the crank arm.

Figure 1:
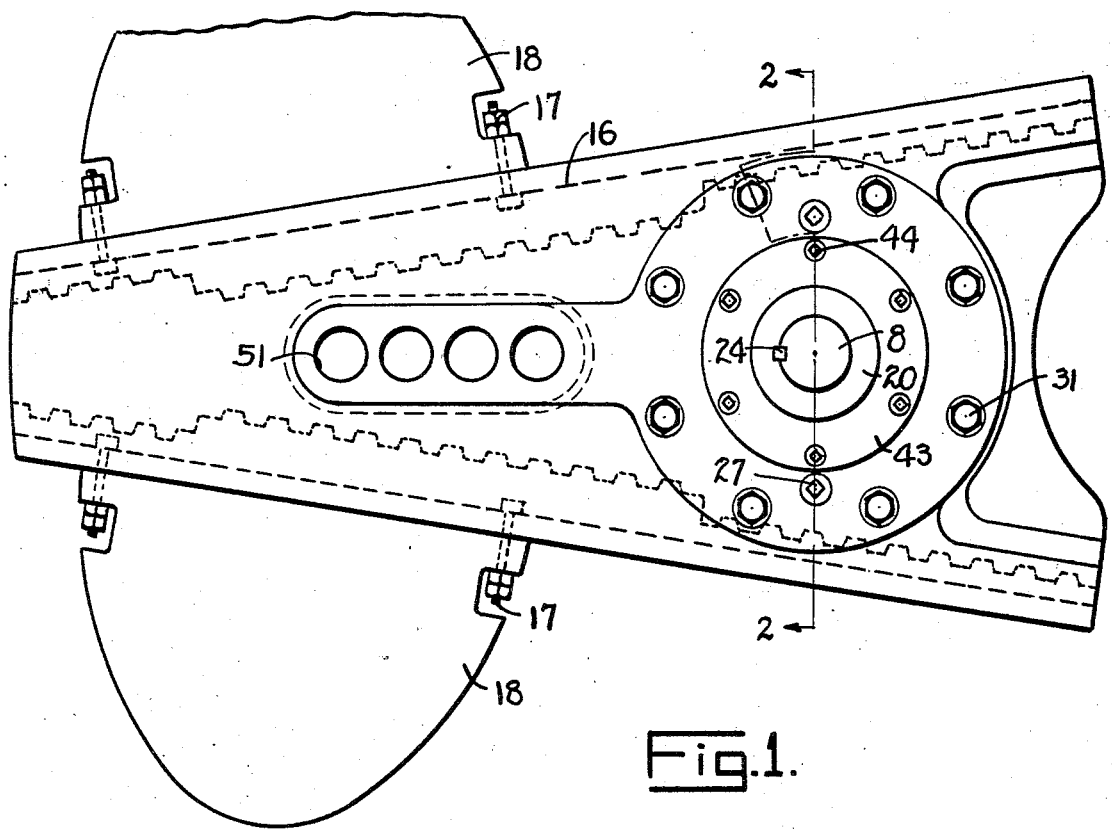
Figure 2:
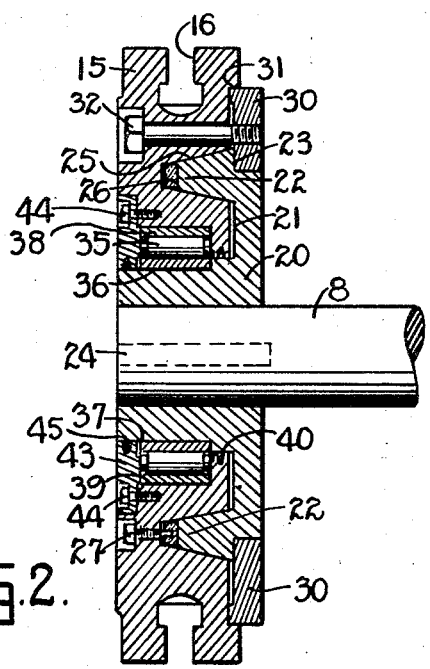
Fig. 2 is a section taken on the line 2—2 of Fig. 1 looking in the direction of the arrows.
Figure 3:
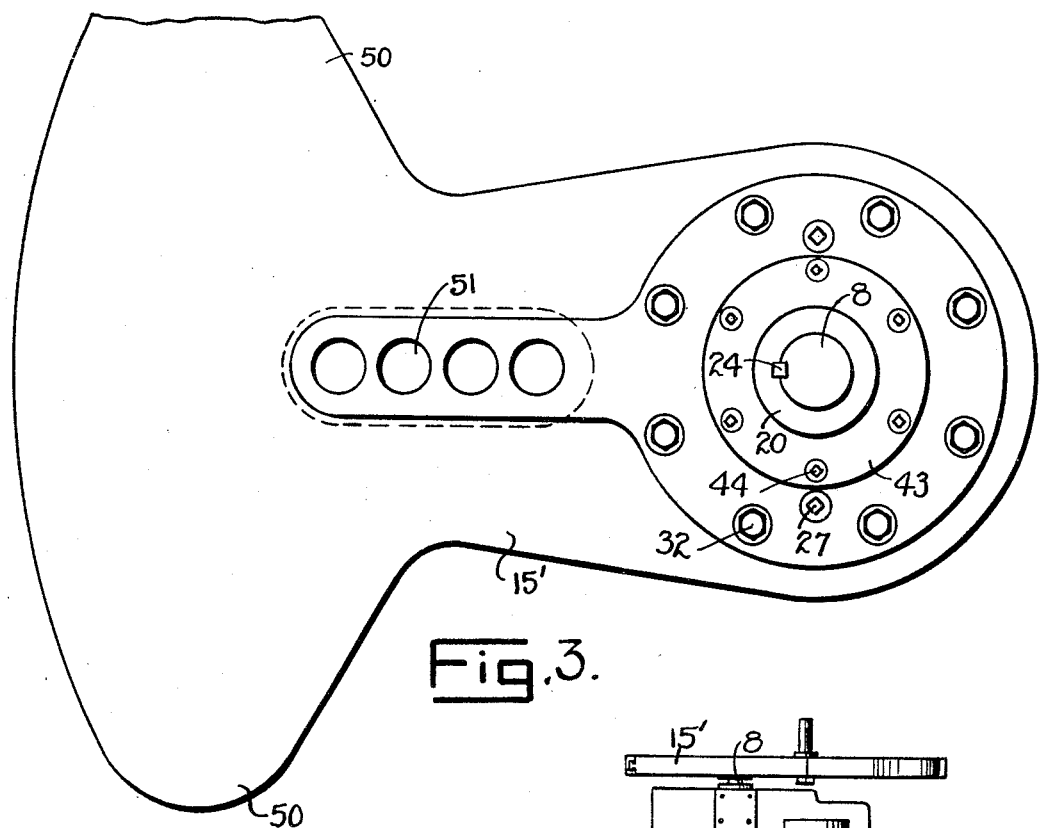
Fig. 3 shows a form of weighted crank with the invention applied thereto.
Figure 4:
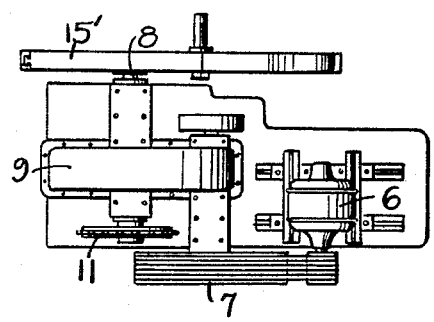
Fig. 4 is a top plan view of a well known form of pumping unit to which the invention has been applied.

Fig. 3 shows a modification of the crank 15, which is indicated at 15'. In this form of the invention the crank is enlarged at 50 to form a weight portion which is integral with the arm or body 15'. The usual wrist pin openings are formed in the crank and indicated at 51. With a weight and crank arm of the type shown in Fig. 3, a uniform amount of counterbalancing may be obtained and the crank may be adjusted circumferentially of the crank shaft to place the weight in either a leading or a trailing position. However, when it is desired to obtain varying amounts of counterbalancing with the same device the form of crank arm and weights illustrated in Fig. 1 is preferable because radial adjustment of the weights will vary the amount of counterbalancing. It seems apparent that in either modification the crank may be adjusted to a leading or lagging position so that the counterbalancing effect will come into use at the proper time to obtain the most satisfactory counterbalancing effect and uniform load upon the power unit 6. Either modification may be arranged to allow the crank and weights to depend freely from the crank shaft when it is desired to use the sprocket 11 in connection with the hoist 2.

While two forms of cranks have been illustrated and described in connection with the invention it is to be understood that it may be applied to any type of crank desired and that the particular essence of the invention resides in the suspension of the crank arm on antifriction bearings in a position so that it may be free to depend from the crank shaft or be adjusted to rotate therewith in any desired position by means of frictional engagement with the crankshaft or parts connected therewith.

I claim:

1. The combination with a crankshaft for well pumping units, a hub, an antifriction bearing thereon, a crank arm mounted on said bearing, interengaging portions on said hub and arm, means to lock said interengaging portions together, and a holding ring to overlie said bearing and retain it in position.

2. The combination with a crankshaft for well pumping units, a hub, an antifriction bearing thereon, a crank arm mounted on said bearing, interengaging portions on said hub and arm, and means to lock said interengaging portions together including a locking ring adapted to overlie a portion of said hub and said arm and rigidly secured to said arm.

3. The combination with a crankshaft for well pumping units, a hub, an antifriction bearing thereon, a crank arm mounted on said bearing, interengaging portions on said hub and arm, and means to lock said interengaging portions together including a locking ring adapted to overlie a portion of said hub and said arm, and bolts passing through said arm and said locking ring.

4. In a well pumping rig, a crank shaft, a hub thereon having a radial body member, a crank arm mounted for rotation upon said hub, interengaging means on said body member and said arm, a ring engaging about said body member and releasable means to secure said ring rigidly to said arm to retain said arm continuously non-rotatable relative to said hub while said rig is pumping.

GUY CROOM.